March 24, 1931. P. LEGRAND 1,797,779
DISINTEGRATING MACHINE
Filed Nov. 11, 1929 3 Sheets-Sheet 1

Paul Legrand
Inventor

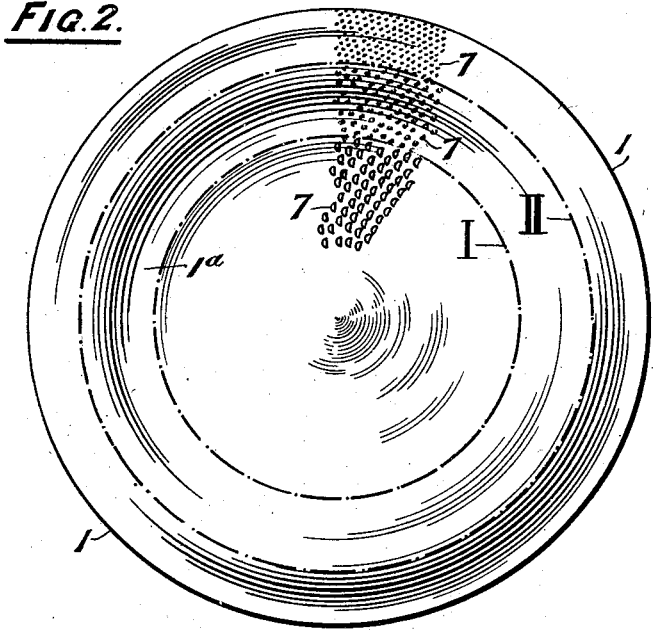
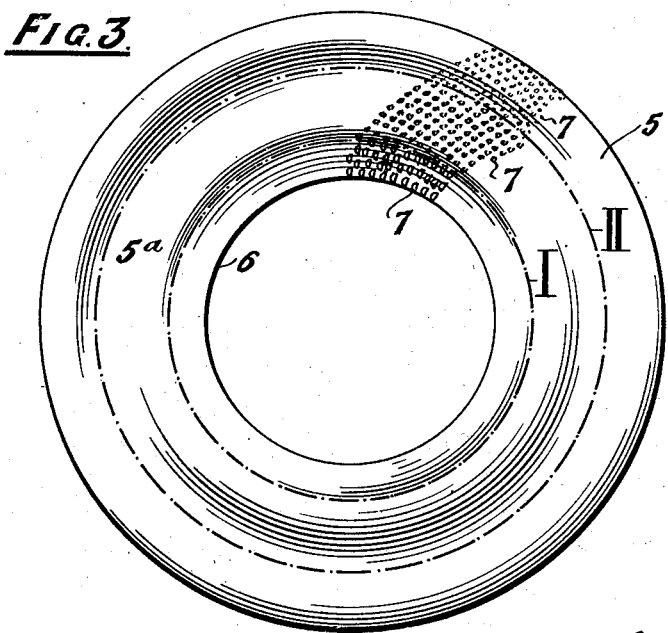

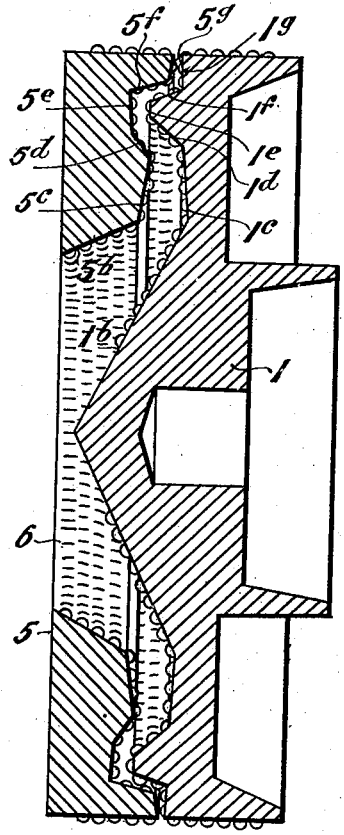
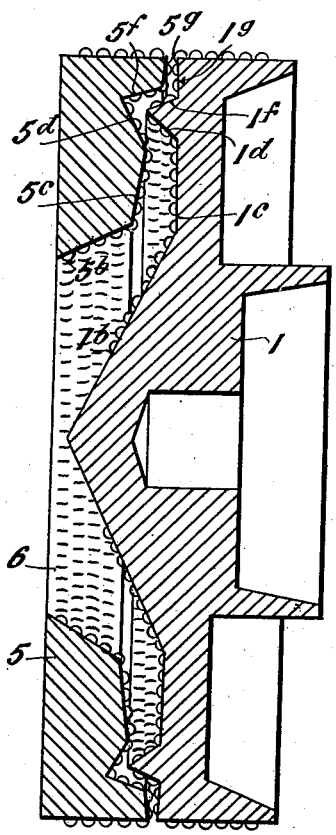

Patented Mar. 24, 1931

1,797,779

UNITED STATES PATENT OFFICE

PAUL LEGRAND, OF BRUSSELS, BELGIUM, ASSIGNOR TO INTERNATIONAL PULVERISING & GRINDING MACHINES (PARENT) CORPORATION LIMITED, OF LONDON, ENGLAND

DISINTEGRATING MACHINE

Application filed November 11, 1929, Serial No. 406,429, and in Belgium November 16, 1928.

This invention relates to disintegrating machines particularly applicable to machines for disintegrating rubber.

In the reclaiming of rubber, it is the general practice mechanically to grind the rubber scrap into fine particles in grinding machines so as to deliver it in a powdered condition suitable for the reclaiming process. It is most important in the mechanical disintegration of the rubber scrap, that it should be torn asunder progressively in continuing diminishing grades until the finely powdered product is discharged from the machine.

The object of the invention is to provide a machine which will give this progressive tearing action.

To this end a machine is constructed in which a stationary disc having a central inlet and formed with a face which is undulating in a radial direction is mounted, and against which stationary disc a correspondingly undulatory rotary disc is opposed, the discs being spaced apart and the distance between the faces of the discs diminishing gradually from the central area to the outer borders of such discs. Rasp teeth are cut in opposed directions on both the stationary disc and the rotary disc, the surfaces of such discs being covered with rasp teeth of a size diminishing as they become distanced from the centre of rotation, there being conveniently concentric zones of teeth with the teeth in each zone of the same size but larger than those in an adjacent outer zone.

The effect of this construction is that the rubber scrap, which is fed through a central aperture in the stationary disc to the space between the stationary disc and the rotary disc, is torn apart continuously but in diminishing grades, and by centrifugal action is fed slowly over the undulations of the disc in an outward direction, where the speed of rotation increases, the distance between the discs decreases and the size of the rasp teeth also diminishes. The torn rubber is subject to continuously increasing speed of tearing as it approaches the outer border of the discs and is delayed in its progress by the undulations, thus ensuring complete tearing of the rubber before it is discharged beyond the peripheries of the discs.

The undulatory faces of the discs may be made up of curves or of flat surfaces disposed at obtuse angles relatively to each other.

The invention will be more particularly described with reference to the accompanying drawings showing preferred embodiments, in which:—

Figs. 2 and 3 are face views of the movable and fixed discs respectively.

Figs. 4 and 5 are sectional views of modified forms of discs.

Figure 1:
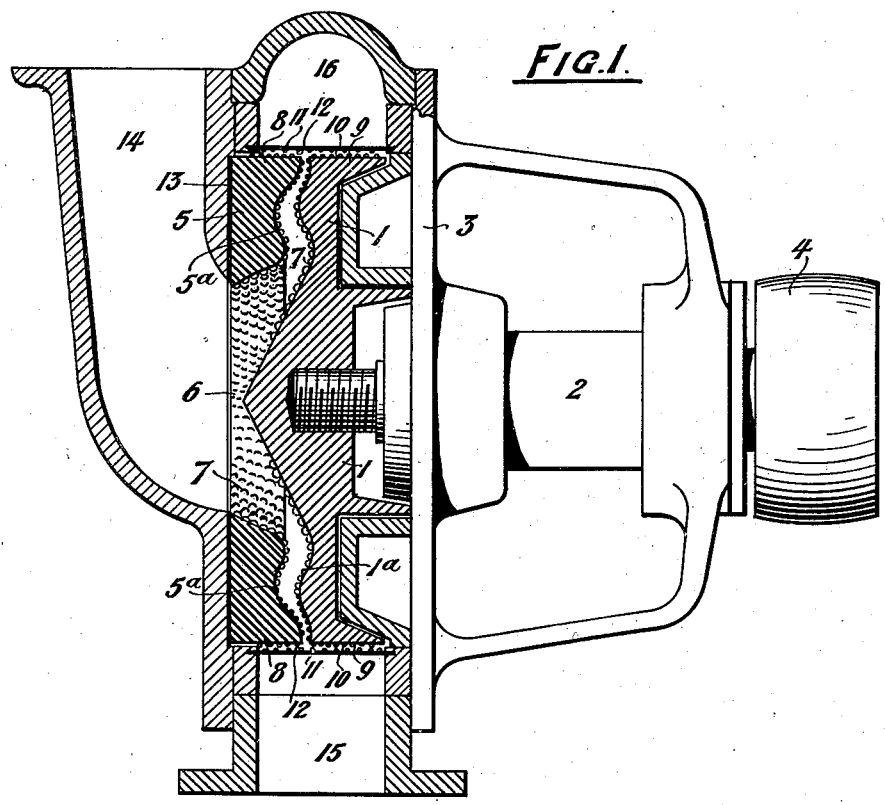
Fig. 1 is a side elevation partly in section of a machine in accordance with this invention.

In Figs. 1 to 3 the movable disc 1 is mounted on a shaft 2 rotatably mounted in a frame 3 and driven by the belt pulley 4. The fixed disc 5 is mounted opposite the outer face of the movable disc and has a central inlet 6. Opposite faces $1^a$ and $5^a$ of these discs are formed with curved surfaces undulating in a radial direction. These opposite faces are so formed that the distance therebetween gradually diminishes from the centre area to the outer borders as shown in Fig. 1. On the opposite surfaces of these discs groups of rasp teeth 7 are cut, those teeth located inwardly of the chain dotted line I being of large size, those located inwardly of the chain dotted line II being of medium size, and those situate between the line II and the outer borders being of small size so that the size diminishes as they become distanced from the centre. These rasp teeth, on the one disc, face in an opposite direction to those on the other disc. Only a few of the teeth are shown but these are carried right around the faces thereof.

The outer surfaces 8 and 9 of the discs may also be provided with rasps 10 and the grinding machine with an annular sieve 11 to fit around the peripheral surfaces of the discs in spaced relationship and said sieve will be provided with oppositively directed rasps 12.

The grinding machine is arranged to accommodate spacing members 13 for regulating the amount of space between the opposite faces of the discs.

The rubber scrap is introduced into the hopper 14 and passes from there through the central inlet 6, and the disintegrated rubber is discharge through the outlet 15 communicating with the lower end of the annular chamber 16.

In the modification shown in Fig. 4 the arrangement is the same except for the shape of the opposed faces of the discs, and like references indicate like parts to those in Figs. 1 to 3. The faces of the discs are formed with flat surfaces, those on the movable disc being marked $1^b$ $1^c$ $1^d$, $1^e$ $1^f$ and $1^g$ and those on the fixed disc being marked $5^b$, $5^c$, $5^d$, $5^e$, $5^f$ and $5^g$, disposed at obtuse angles relatively to each other and being of annular form extending around the discs concentrically with the axis of rotation. These faces are so arranged as shown to be undulatory in a radial direction, and the distance between these faces diminishes from the centre area to the outer borders of the discs.

Fig. 5 shows a similar view to Fig. 4 of a somewhat simpler form, and in this Fig. 5 like references indicate like parts to those in Fig. 4.

Instead of making the teeth in the form of rasps integral with the discs these may be obtained by agglomerates of abrasive substances, such as emery, corundum, carborundum and the like.

Although the machine as described is particularly applicable to the disintegration of rubber it may be applied to the similar treatment of other substances which can be advantageously disintegrated by a progressive tearing action.

What I claim as my invention and desire to secure by Letters Patent is:—

1. A disintegrating machine having a fixed disc formed with a central inlet and a face undulating in a radial direction, a rotary disc mounted opposite said fixed disc and formed with an opposed corresponding undulatory face spaced apart from the fixed disc by a distance diminishing gradually from its central area to its outer borders, and teeth on said opposite faces of a size diminishing as they become distanced from the centre of the discs.

2. A disintegrating machine having a fixed disc formed with a central inlet and a face undulating in a radial direction, a rotary disc mounted opposite said fixed disc and formed with an opposed corresponding undulatory face spaced apart from the fixed disc by a distance diminishing gradually from its central area to its outer borders, and teeth formed in concentric zones with the teeth in each zone of the same size but diminishing in size as the zones become distanced from the centre of rotation.

3. A disintegrating machine having a fixed disc formed with a central inlet and a face undulating in a radial direction, a rotary disc mounted opposite said fixed disc and formed with an opposed corresponding undulatory face spaced apart from the fixed disc by a distance diminishing gradually from its central area to its outer borders, and rasp teeth made in opposed directions on said opposite faces of a size diminishing as they become distanced from the centre.

4. A disintegrating machine having a fixed disc formed with a central inlet and a face undulating in a radial direction, a rotary disc mounted opposite said fixed disc and formed with an opposed corresponding undulatory face spaced apart from the fixed disc by a distance diminishing gradually from its central area to its outer borders, and rasp teeth made in opposed directions on said opposite faces and formed in concentric zones with the teeth in each zone of the same size but with the teeth in different zones diminishing in size as the zones become distanced from the centre of rotation.

5. A disintegrating machine having a fixed disc formed with a central inlet and a number of flat concentric annular surfaces disposed at obtuse angles relatively to each other, a rotary disc mounted opposite said fixed disc and formed with a corresponding number of flat concentric annular surfaces disposed at obtuse angles relatively to each other and so arranged that the space between the flat surfaces diminishes gradually from its central area to its outer borders, and teeth on said opposite faces of a size diminishing as they become distanced from the centre of the discs.

6. A disintegrating machine having a fixed disc formed with a central inlet and a number of flat concentric annular surfaces disposed at obtuse angles relatively to each other, a rotary disc mounted opposite said fixed disc and formed with a corresponding number of flat concentric annular surfaces disposed at obtuse angles relatively to each other and so arranged that the space between the flat surfaces diminishes gradually from its central area to its outer borders, and teeth formed in concentric zones with the teeth in each zone of the same size but diminishing in size as the zones become distanced from the centre of rotation.

7. A disintegrating machine having a fixed disc formed with a central inlet and a number of flat concentric annular surfaces disposed at obtuse angles relatively to each other, a rotary disc mounted opposite said fixed disc and formed with a corresponding number of flat concentric annular surfaces disposed at obtuse angles relatively to each other and so arranged that the space between the flat surfaces diminishes gradually from its central area to its outer borders, and rasp teeth made in opposed directions on said opposite faces and formed in concentric zones with the teeth in each zone of the same size but with the teeth in different zones diminishing in size as the zones become distanced from the centre of rotation.

8. A disintegrating machine having a fixed disc formed with a central inlet and a face undulating in a radial direction, a rotary disc mounted opposite said fixed disc and formed with an opposed corresponding undulatory face spaced apart from the fixed disc by a distance diminishing gradually from its central area to its outer borders, teeth on said opposite faces of a size diminishing as they become distanced from the centre of the discs, a sieve surrounding said disc and opposed teeth on the opposite surfaces of said sieve and discs.

9. A disintegrating machine having a fixed disc formed with a central inlet and a face undulating in a radial direction, a rotary disc mounted opposite said fixed disc and formed with an opposed corresponding undulatory face spaced apart from the fixed disc by a distance diminishing gradually from its central area to its outer borders, teeth on said opposite faces of a size diminishing as they become distanced from the centre of the discs, a housing for said discs and means for varying the distance between the faces of said discs.

In witness whereof I have hereunto set my hand.

PAUL LEGRAND.